United States Patent [19]

Clemens et al.

[11] 4,053,140

[45] Oct. 11, 1977

[54] FIBER REINFORCED PLASTIC HANDRAIL SYSTEM

[76] Inventors: Donald L. Clemens, 1826 Willow Road, Carrollton, Tex. 75006; Steven A. Edmiston, 14215 Tanglewood Drive, Dallas, Tex. 75234

[21] Appl. No.: 681,696

[22] Filed: Apr. 29, 1976

[51] Int. Cl.² .......................................... E04H 17/00
[52] U.S. Cl. ...................................... 256/19; 256/66; 403/233; 403/191
[58] Field of Search .............. 256/65, 66, 67, 68, 256/69, 70, 19, 59, 22, 21; 403/233, 234, 235, 237, 191

[56] References Cited

U.S. PATENT DOCUMENTS

| 2,150,651 | 3/1939 | Ewing | 256/22 X |
| 2,764,438 | 9/1956 | Haviland | 403/234 |
| 3,490,063 | 1/1970 | Romney | 403/235 |
| 3,700,213 | 10/1972 | Blease | 256/19 |

FOREIGN PATENT DOCUMENTS

| 663,453 | 5/1963 | Canada | 403/235 |
| 1,118,050 | 3/1956 | France | 403/233 |
| 707,041 | 4/1954 | United Kingdom | 256/21 |

Primary Examiner—Andrew V. Kundrat
Attorney, Agent, or Firm—Richards, Harris & Medlock

[57] ABSTRACT

A fiber reinforced, non-corrosive, non-conductive, plastic handrail system having a continuous handrail member secured to a plurality of upright posts by an improved bisectional collar. A midrail member can be secured to the posts by a second bisectional collar as a continuous segment or a linking segment. Such bisectional collars are also used in joints such as for attachment of railings adjacent stairways.

20 Claims, 8 Drawing Figures

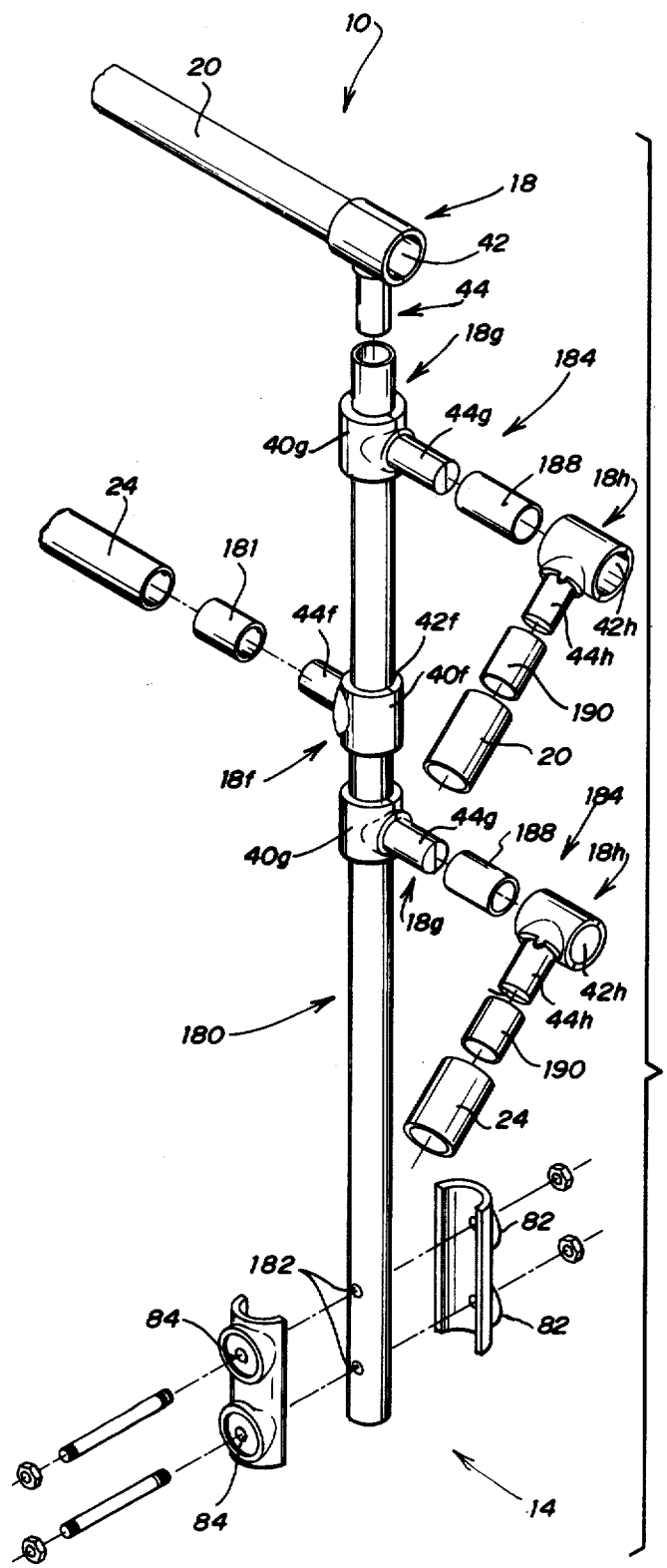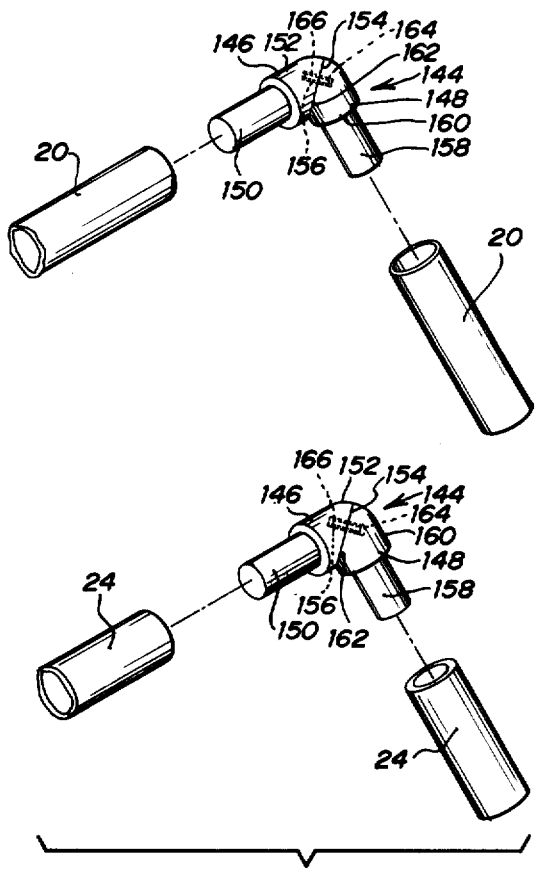

FIBER REINFORCED PLASTIC HANDRAIL SYSTEM

BACKGROUND OF THE INVENTION

Handrail systems have long been employed in industrial applications as safety measures along stairways, around platforms, oil storage tanks, and the like. Heretofore most handrail systems have been constructed of metallic substances such as iron, steel, aluminum, and the like. When employing metallic handrail units problems have been encountered in areas having corrosive environments and/or electric currents and electric fields.

In efforts to overcome the problems encountered with the use of metallic handrail units, several systems have been proposed using plastic materials. However, such units have sacrificed strength in order to eliminate the corrosive and conductivity problems inherent with metallic systems. Thus, the units heretofore proposed using plastic materials have not been completely acceptable because of the inherent structural weakness of such units.

Therefore, a need has long existed for an improved handrail system which would be resistant to corrosive environments, electrically non-conductive, non-sparking and fire retardant, and yet would be substantially light weight and sturdy. In addition, such unit should allow fast, simple installation and be readily modified to any shape or configuration.

STATEMENT OF THE INVENTION

According to the present invention an improved fiber reinforced plastic handrail system is provided which is light weight, of sturdy construction, and can be fabricated at the location of the structure with hand tools. The improved fiber reinforced plastic handrail unit of the invention is non-conductive, non-corrosive, and attractive in appearance.

Broadly, the improved fiber reinforced plastic handrail system comprises a plurality of fiber reinforced plastic post members, base mounts for securing each of the post members to the super structure of the structure employing the handrail system, an end joint fitting secured to the upwardly extending end portion of each post member for receiving a handrail member, and preferably an inner joint fitting carried by each post member at a position intermediate its end portions for receiving a midrail member. More specifically, the end joint fittings and inner joint fitting are formed of a fiber reinforced plastic composition and each comprise a collar section and a leg section and each are split longitudinally to form half sections which facilitate their use in connecting the handrail member and the midrail member to each post member.

DESCRIPTION OF THE DRAWINGS

A more complete understanding of the invention may be had by reference to the following detail description when taken into conjunction with the accompanying drawings wherein:

FIG. 5 is an exploded detail view depicting an alternate joint for connecting segments of a handrail or a midrail;

FIG. 6 is a partial, exploded detail view depicting another embodiment for securing a handrail to a post;

FIG. 7 is an exploded detail view depicting another embodiment of the interconnection between a post member, a handrail, a midrail and a base mount; and, FIG. 8 is a partial, exploded view depicting another embodiment for securing a midrail to the post of FIG. 7.

DETAILED DESCRIPTION

Figure 1:
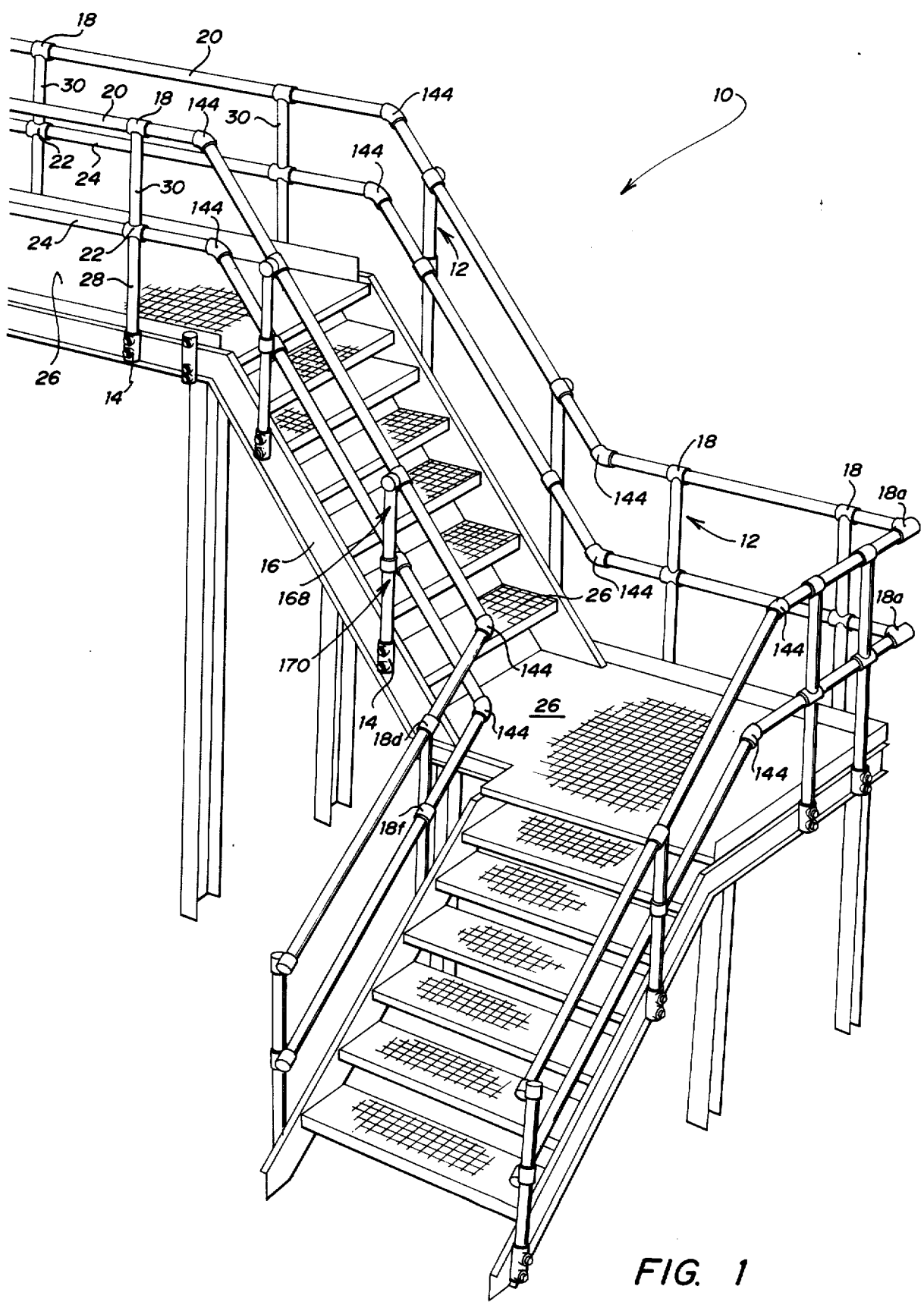
FIG. 1 is a partial perspective view depicting a preferred handrail system of the present invention.

Referring now to the drawings, and particularly FIG. 1 thereof, there is shown an improved handrail system 10 incorporating the subject invention. Handrail system 10 comprises a plurality of post members 12, each secured in a substantially upright position by a base mount 14. Thus, a base mount 14 is affixed to the lower end portion of each post member 12 so that post members 12 can be secured to super structure element 16 of a structure employing handrail system 10. A plurality of end joint fittings 18 are secured to the upwardly extending end portions of post members 12, each end joint fitting 18 cooperates to securely affix handrail member 20 to post members 12. When desired, inner joint fitting 22 can be carried by each post member 12 at a position intermediate its end portions for attachment of midrail member 24 thereto. A plastic reinforced grating 26 is secured to super structure element 16 to form a platform and/or stairs as shown.

Figure 2:
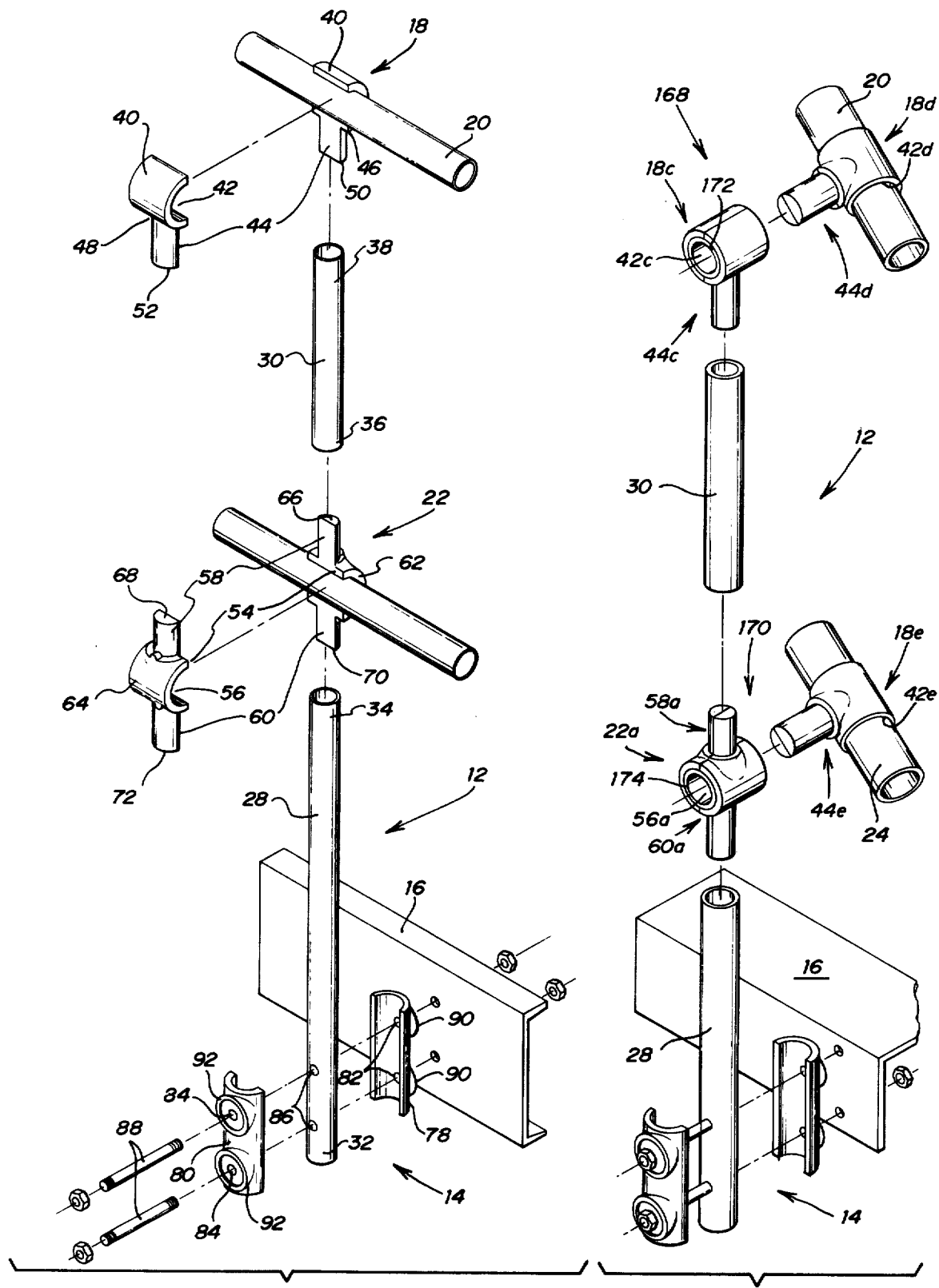
FIG. 2 is an exploded detail view depicting the interconnection between a post member, a handrail, a midrail and a base mount.

Referring now to FIG. 2 in combination with FIG. 1, post member 12 is a sectional, fiber reinforced, hollow, plastic post member having lower segment 28 and upper segment 30. The lower extending end portion 32 of lower segment 28 is secured to super structure element 16 by base mount 14. The upwardly extending end portion 34 of lower segment 28 is secured to lower extending end portion 36 of upper segment 30 by inner joint fitting 22. As shown, upwardly extending end portion 38 of upper segment 30 is secured to handrail member 20 by end joint fitting 18.

End joint fitting 18 is made of a fiber reinforced plastic material and is provided with collar 40 having a passageway 42 therethrough, and leg 44. End joint fitting 18 is split longitudinally and is thus formed of a half section 46 and a half section 48, each being substantially mirror images of the other. Leg 44 which comprises two semi-cylindrical shaped leg sections 50 and 52, is fabricated of a size to have an outside diameter slightly less than the inside diameter of upper segment 30 so that leg 44 can be positioned within the upwardly extending end portion of upper segment 30 of post member 12 thus allowing end joint fitting 18 to be secured to post member 12 by any suitable means, such as an epoxy resin. As can readily be seen, leg 44 has a longitudinal axis substantially perpendicular to the axis of passageway 42 of collar 40.

Inner joint fitting 22 is made of a fiber reinforced plastic material and is provided with collar 54 having a passageway 56 therethrough and legs 58 and 60. Legs 58 and 60 are provided with a common longitudinal axis which is substantially perpendicular to the axis of passageway 56 defined by collar 54. Inner joint fitting 22 is split longitudinally and thus is formed of a half section 62 and a half section 64, each being substantially mirror images of the other. Leg 58 thus comprises two semi-cylindrical shaped leg sections 66 and 68. Likewise, leg 60 comprises two semi-cylindrical shaped leg sections 70 and 72. Legs 58 and 60 interconnect lower segment 28 and upper segment 30 of post member 12 and are fabricated of a size to have an outside diameter slightly less than the inside diameter of upper segment 30 and lower segment 28, respectively. Thus, leg 58 is positioned within the lower portion of upper segment 30 and secured therein by an adhesive, such as epoxy resin, and leg 60 is positioned within the upwardly extending end portion of lower segment 28 and secured therein by a suitable adhesive, such as epoxy resin.

Each base mount 14 is made of a fiber reinforced plastic material and comprises a pair of base mounting brackets 78 and 80 which fit around lower end portion 32 of lower segment 28 of post member 12. Apertures 82 are provided in base mounting bracket 78 and apertures 84 are provided in base mounting bracket 80. In addition, apertures 86 are provided in lower end portion 32 of lower segment 28 of post member 12. Base mounting brackets 78 and 80 are provided with a plurality of boss members 90 and 92, respectively, formed as an integral part thereof around each aperture 82 and 84, respectively. Boss members 90 and 92 provide a flat surface on each base mounting bracket such that it can be abutted to a flat surface such as a super structure element 16 to further secure and stabilize post member 12. Thus, upon positioning base mounting brackets 78 and 80 around the lower portion 32 of lower segment 28 of post member 12, apertures 82, 84 and 86 can be aligned for receiving a fastener, such as bolts from nut and bolt assemblies 88, so that base mount 14 and post member 12 can be secured to super structure element 16.

Figure 3:
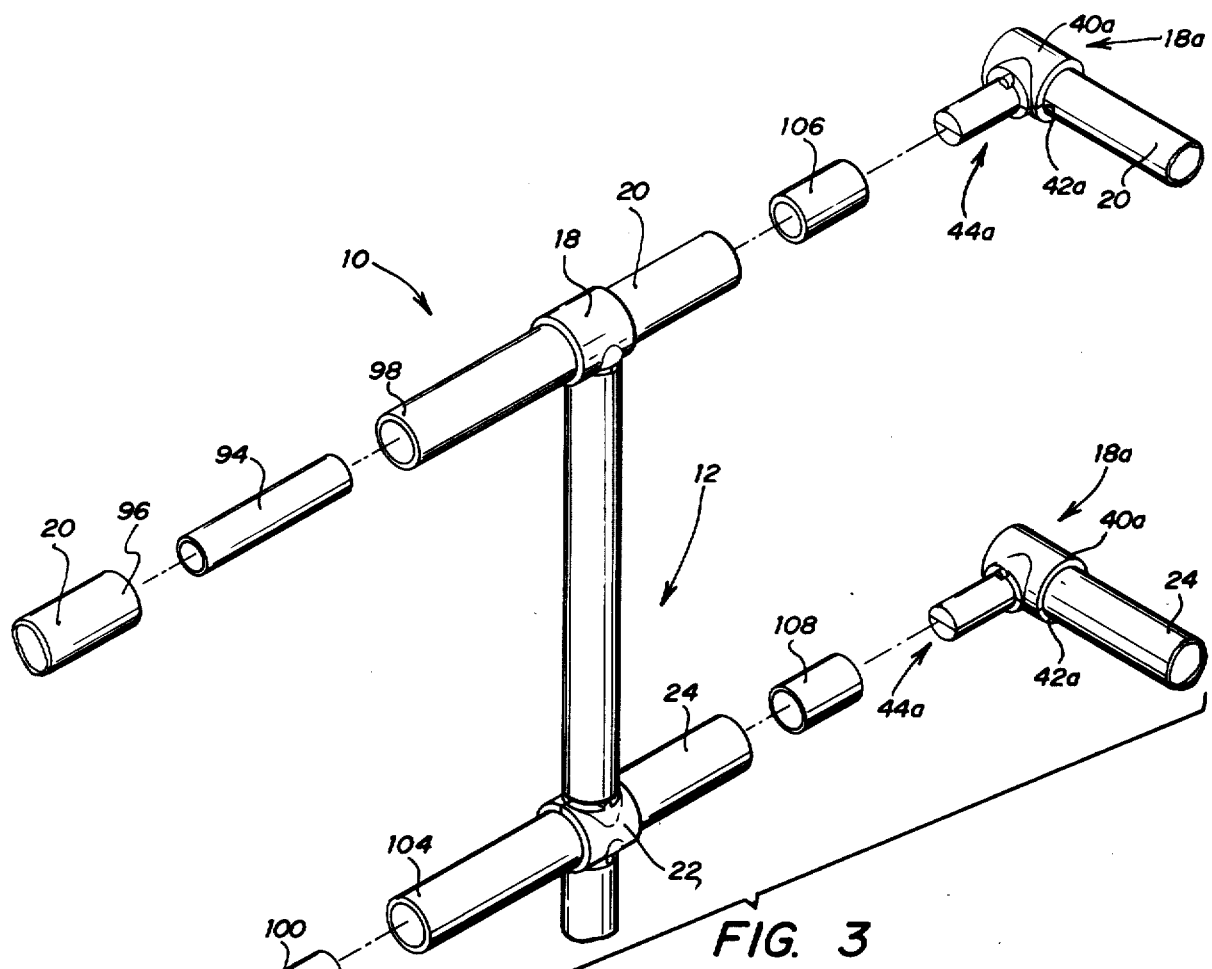
FIG. 3 is an exploded detail view depicting a 90° angle corner of the handrail of the subject invention.

Referring now to FIG. 3 a means for inter-connecting segments of handrail member 20 and midrail member 24 is shown. Further, in this particular embodiment means are shown for allowing a substantially 90 degree turn in the handrail system 10 of the invention. Handrail member 20 and midrail member 24 are normally employed in substantially long segments which allow inter-connecting to a plurality of post members 12, via end joint fitting 18 and inner joint fitting 22, respectively. However, under certain circumstances the span of handrail member 20 and midrail member 24 are such that separate segments of same must be connected. When such occurs, splice member 94 is positioned within extending end portion 96 of a first segment of handrail member 20 for a distance sufficient to allow about one half of splice member 94 to extend within end portion 96. Splice member 94 can be secured within handrail member 20 by any suitable means, such as an epoxy resin. End portion 98 of a second segment of a handrail member 20 is then positioned over the extending end portion of splice member 94 and secured thereto with an adhesive, such as epoxy resin, so as to abut the two adjacent end portions 96 and 98 of the two segments of handrail member 20. Likewise, when it is desirable to couple segments of midrail member 24, splice member 100 is inserted within the extending end portion 102 of midrail member 24 for a distance sufficient to allow about one half of splice member 100 to extend therefrom. Thereafter, end portion 104 of a second segment of midrail 24 is positioned upon the extending end portion of splice member 100 so as to allow abuttment of adjacent end portions 102 and 104 of the segments of midrail member 24. Splice member 100 can be secured within end portion 102 and 104 of midrail member 24 by an adhesive, such as epoxy resin.

A 90° angle turn can be provided in handrail system 10, and thus handrail member 20 and midrail member 24 by employing end joint fittings 18a in conjunction with handrail member 20 and midrail member 24, respectively, as illustrated in FIG. 3. The 90° angle joints made by utilizing end joint fittings 18a are illustrated in the handrail system which surrounds the platform of both the first flight of stairs in FIG. 1. Now again referring to FIG. 3, end joint fittings 18a are identical in structure to end joint fitting 18 described in connection with FIG. 2, and various structural features thereof are illustrated by the same characters as used in describing the structural features of end joint fitting 18 except each such character is followed with the subscript a.

Thus, as shown, end joint fittings 18a are utilized to interconnect segments of handrail member 20 and segments of midrail member 24 at right angles. The interconnection between legs 44a of end joint fittings 18a and handrail member 20 and midrail member 24 is made utilizing bushings 106 and 108, respectively. It is noted that bushings 106 and 108 are only necessary because with the handrail system as illustrated in the drawings, the internal diameter of handrail member 20 and midrail member 24 is larger than the internal diameter of segments of post member 12. Bushing members 106 and 108 are made of fiber reinforced plastic material and are slidably positioned upon legs 44a of the two end joint fittings 18a, as illustrated in the drawing, and are secured thereto by an adhesive, such as epoxy resin. Thereafter, legs 44a, one carrying bushing 106 and the other carrying bushing 108, are positiond within the extending end portions of handrail member 20 and midrail member 24, respectively. As can be seen, the axis of passageways 42a of the two end joint fittings 18a are substantially perpendicular to the longitudinal axis of handrail member 20 and midrail member 24 into which legs 44a were positioned. Thereafter, segments of handrail member 20 and midrail member 24 are positioned respectively within the two passageways 42a of the two end joint fittings 18a and secured therein by an adhesive, in a manner as illustrated in the drawing, thus providing a 90° angle turn in handrail member 20 and midrail member 24. It will be appreciated that if the same stock material is utilized for the lower segment 28 and upper segment 30 of post member 12 as is used in handrail member 20 and midrail member 24 then bushings 106 and 108 can be eliminated when forming the 90° angle joint as illustrated in FIG. 3. Alternately, of course, leg 44a can be made of a greater diameter than leg 44 of end joint fittings 18 and thereby eliminate the necessity of using bushings 106 and 108.

Figure 4:
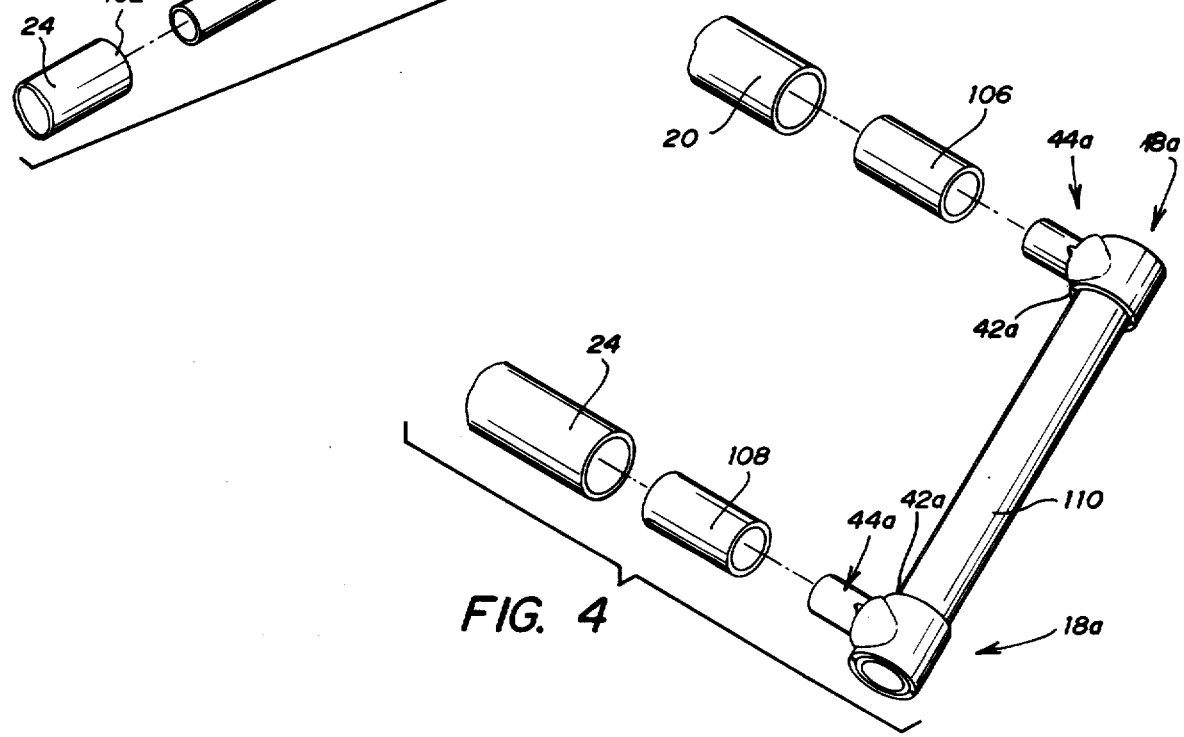
FIG. 4 is an exploded detail view of the end termination of the handrail and the midrail of the handrail of the subject invention.

Referring now to FIG. 4, an end termination of handrail member 20 and midrail member 24 is depicted employing end joint fittings 18a in conjunction with end termination member 110. More specifically, the joint assembly which comprises end joint fitting 18a and bushing 106 and the joint assembly which comprises end joint fitting 18a and bushing 108 are utilized in the same manner as illustrated in FIG. 3 except that the end joint fittings 18a are rotated 90° so that passageways 42a are in alignment, and end termination 110 is secured within each of these passageways 42a respectively, by a suitable adhesive, such as epoxy resin. Thus, the end termination of handrail member 20 and midrail member 24 can be used at any time that the handrail system 10 stops intermediate of a post member 12, such as for example, on the lower part of a stairway.

Referring now to FIG. 5 another embodiment of a coupling means is shown for connecting segments of handrail member 20 and/or midrail member 24. Coupling assembly 144 comprises a first coupling member 146 and a second coupling member 148, each of which is substantially identical in construction. First coupling member 146 is provided with a cylinderical shaped leg 150 extending from an enlarged body 152. Body 152 is further provided with a beveled side portion 154. Beveled side portion 154 is at a substantially 45° angle with respect to the longitudinal axis of leg 150. Pin receiving aperture 156 is provided in the beveled side portion 154 of body 152, the axis of pin receiving aperture being substantially perpendicular to the plane of beveled side portion 154.

Second coupling member 148 is also provided with a cylindrical shaped leg 158 extending from an enlarged body 160. Body 160 is provided with a beveled side portion 162 at its end removed from leg member 158, the angle of the beveled side portion being at a substantially 45° angle with respect to the longitudinal axis of leg 158 of body 160. Pin receiving aperture 164 is provided within the bevel side portion 162, the axis of pin receiving aperture 164 being substantially perpendicular to the plane of beveled side portion 162. Pin 166 is then positioned within pin receiving aperture 156 of first coupling member 146 and pin receiving aperture 164 of second coupling member 148 and the beveled face portions of each of said members are then secured together by an adhesive, such as epoxy resin.

Leg 150 of first coupling member 146 and leg 158 of second coupling member 148 are then positioned within respective end portions of handrail member 20 and/or midrail member 24 and secured therein by the use of a suitable adhesive, such as epoxy resin. If required bushings can be positioned upon legs 150 and 158 and affixed thereto to assist in the coupling of coupling members 146 and 148 to handrail member 20 and/or midrail member 24, the use of coupling assemblies 144 is shown in FIG. 1. As illustrated, coupling assemblies 144 are used to interconnect segments of handrail member 20 and midrail member 24 at the intersection of the stairways and the platforms as handrail system 10 extends therearound. Thus, as can radily be seen, coupling assemblies 144 can be used to produce substantially any angle for handrail member 20 and midrail member 24 of handrail system 10 by merely rotatably positioning coupling members 146 and 148 of coupling assembly 144 such that legs 150 and 158 extend therefrom at the desired angle.

Referring now to FIG. 6, another embodiment is depicted for securing handrail member 20 and midrail member 24 to a post member 12 at any desired angle such as on a stairway, for example. Post member 12 is a multi-section member as previously described and is connected to handrail member 20 and midrail member 24 by joint 168 and joint 170, respectively. Post member 12 is secured to superstructure element 16 by base mount 14, hereinabove described in detail with reference to FIG. 2. Joint 168 comprises a pair of interconnecting end joint fittings 18c and 18d. End joint fitting 18c is illustrated as being identical in structure to end joint fitting 18 having its features described by the same characters as corresponding features of end joint fitting 18 except followed by a subscript c. It is noted at this point that end joint fitting 18c can comprise a unitary member and not a bisectional member as shown. However, for ease of assembly, it is preferred that end joint fitting 18c have the same configuration and dimensions as end joint fitting 18. Thus, leg 44c of end joint fitting 18c fits within the top of upper segment 30 and is secured therein by a suitable adhesive, such as epoxy resin. Furthermore, a bushing 172 is retained within passageway 42c by a suitable adhesive, such as epoxy resin.

Bushing 172 receives leg 44d of end joint fitting 18d which is secured therein by a suitable adhesive such as epoxy resin. Again in joint fitting 18d you have substantially the same configuration as in joint fitting 18 depicted in FIG. 2 and structural features of end joint fitting 18d will be described as the same characters as used to describe corresponding features of end joint fitting 18 except the characters are followed by a subscript d. As can be seen, passageway 42d receives a handrail member 20. Thus, as described the interconnection of upper segment 30 of post member 12 with end joint fitting 18c and end joint fitting 18d form the joint 168 for securing handrail member 20 at any suitable angle to post member 12. It is noted that leg 44d of end joint fitting 18d can have a diameter slightly smaller than the inside diameter of passageway 42c, and thus bushing 172 can be eliminated. However, it is preferred that all end joint fittings 18 be of the same configuration and dimensions to allow for easy interchangability of parts when constructing the novel handrail system 10 of the subject invention.

Joint 170 comprises inner joint fitting 22a and end joint 18e. Inner joint fitting 22a and end joint 18e are identical in structure to inner joint fitting 22 and end joint 18 described in connection with FIG. 2, and various structural features thereof are illustrated by the same characters as used in describing the structural features of inner joint fitting 22 and end joint 18 except the characters referring to inner joint 22 are followed with the subscript a whereas the characters referring to end joint 18 are followed with the subscript e. It should be noted that inner joint fitting 22a can comprise a unitary member and not a bisectional member as shown. However, for ease of assembly, it is preferred that inner joint fitting 22a have the same configuration and dimensions as inner joint fitting 22. Thus legs 58a and 60a interconnect lower segment 28 and upper segment 30 of post member 12 and each of the legs are secured within the proper segment by a suitable adhesive, such as epoxy resin. Furthermore, a bushing 174 is retained within passageway 56a by a suitable adhesive such as epoxy resin.

Bushing 174 receives leg 44e of end joint fitting 18e which is secured therein by a suitable adhesive, such as expxy resin. As can readily be seen, passageway 42e receives a midraill member 24. As described, the interconnection of inner joint fitting 22a and end joint 18e form the joint 170 for securing midrail member 24 at any suitable angle to post member 12. If desired, leg 44e of end joint fitting 18e can be fabricated to have a diameter slightly smaller than the inside diameter of passageway 56a, and thus bushing 174 can be eliminated. However, as stated before, it is preferred that all end joint fittings 18 be of the same configuration and dimensions to allow for easy interchangeability of parts when constructing the novel handrail system 10 of the invention.

Referring now to FIG. 7, an embodiment for an end-post member 180, a unitary member is shown. End-post member 180 is especially useful as a cornerpost for handrail system 10 where stairs of a stairway commence. End-post member 180 is provided with apertures 182 in its lower end portion which are aligned with and cooperate with apertures 82 and 84 of base mounting bracket 14 so that end-post member 180 can be secured to the super structure element of a structure on which handrail system 10 is employed. End joint fitting 18 is secured to the upwardly extending end portion of end-post member 180 via leg 44 and one end portion of a handrail member 20 is secured within passageway 42 of end joint fitting 18 with an adhesive, such as epoxy resin. Midrail member 24 is also secured to end-post member 180 by end joint fitting 18f. Passageway 42f of collar 40f of end joint fitting 18f is positioned upon end-post member 180 and bushing 181 is secured upon leg 44f so that leg 44f of end joint fitting 18f is positioned within one end portion of midrail member 24. Leg 44f and bushing 181 are secured within midrail member 24 and end-post member 180 is secured within passageway 42f by a suitable adhesive, such as epoxy resin.

Any desired angle turn can be provided in handrail member 20 and midrail member 24 of the handrail system 10 of the present invention by employing coupling assembly 184. Coupling assembly 184 comprises a pair of interconnecting end joint fittings, 18g and 18h. It should again be noted that end joint fittings 18g and 18h are identical in configuration and structure to end joint fitting 18 described in connection with FIG. 2, and various structural features thereof are illustrated by the same characters as used in describing the structural feature of end joint fitting 18 except each such character is followed by the subscript g or h.

Coupling assembly 184, which is employed to connect another segment of handrail member 20 and midrail member 24 to end-post member 180 comprises end joint fitting 18g and 18h. Collar 40g of end joint fitting 18g is positioned around a portion of end-post member 180 in a manner so that leg 44g extends outwardly therefrom in the desired direction. Collar 40g is retained at the desired position on end-post member 180 by a suitable adhesive, such as epoxy resin.

A bushing 188 is positioned within passageway 42h of end joint fitting 18h and retained therein by an adhesive, such as epoxy resin. Bushing 188 receives leg 44g of end joint fitting 18g which is also secured therein by a suitable adhesive. Leg 44h is provided with a bushing 190 which is secured thereon by an adhesive. Therefter, end portions of segments of handrail member 20 and midrail member 24 are positioned respectively upon bushing 190 of the two end joint fittings 18h and secure thereto by an adhesive in a manner as illustrated in the drawing. By employing coupling assembly 184 any desired angle turn in handrail member 20 and midrail member 24 can be made.

Figure 8:
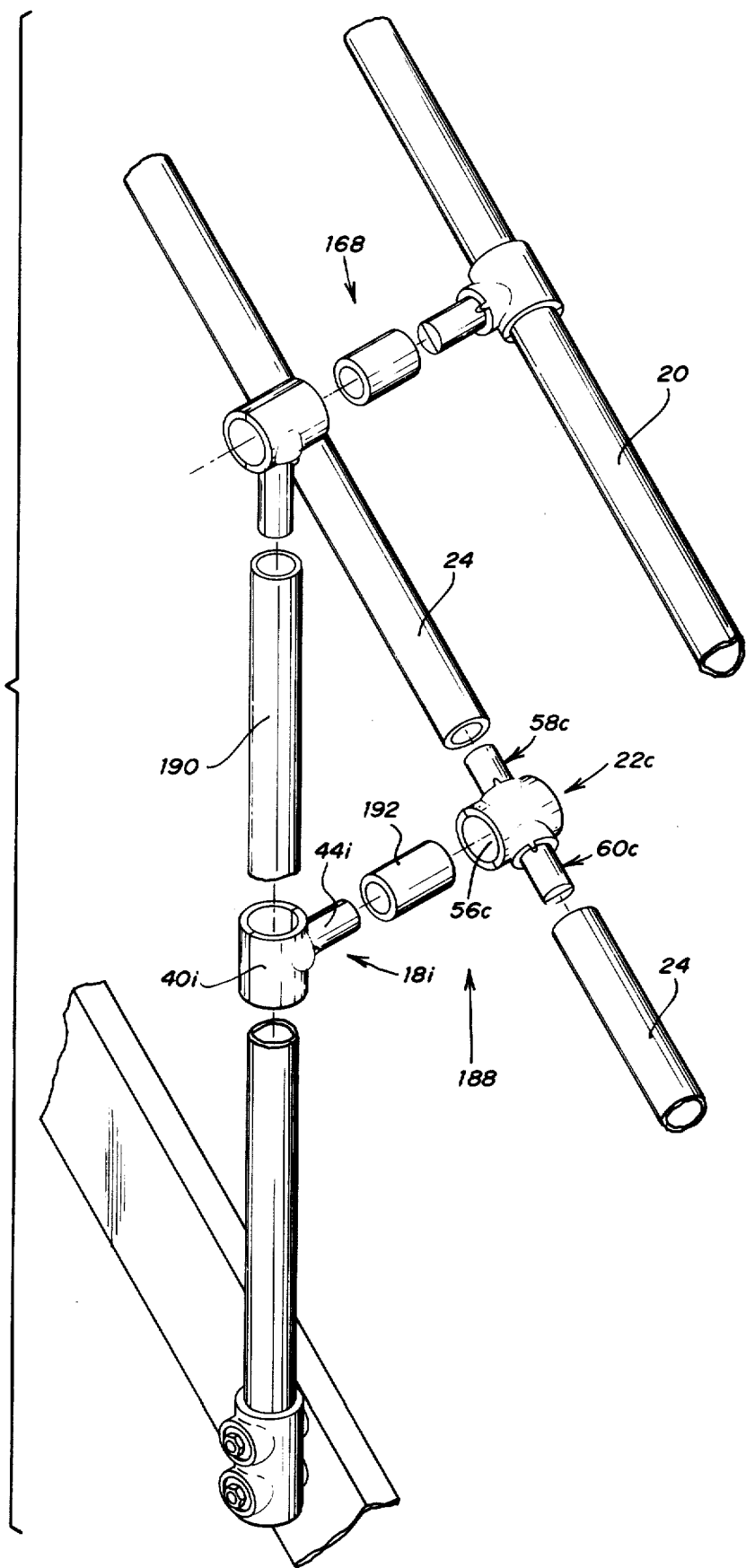

Referring now to FIG. 8 another embodiment of a coupling assembly 188 for connecting midrail 24 to a unitary post member 190 is shown. Coupling assembly 188 comprises end joint fitting 18i and inner joint fitting 22c. End joint fitting 18i and inner joint fitting 22c are identical in structure to end joint fitting 18 and inner joint fitting 22 described in connection with FIG. 2, and various structural features thereof are illustrated by the same characters as used in describing the structural features of end joint fitting 18 and inner joint fitting 22 except each such character is followed with the subscript i and c, respectively.

Coupling assembly 188 for connecting midrail member 24 to post member 190 is normally used in combination with joint 168, described in detail with reference to FIG. 6, which is used to connect handrail member 20 to post member 190. Coupling assembly 188 comprises interconnecting end joint 18i and inner joint fitting 22c. Collar 40i of end joint fitting 18i is positioned around post member 190 at a desired position and secured thereto by an adhesive, such as epoxy resin. Leg 44i of end joint fitting 18i extends from collar 40i and thus post member 190 in the direction of the midrail 24 and in a plane perpendicular to the longitudinal plane of midrail 24.

A bushing 192 is retained within passageway 56c of inner joint fitting 22c by a suitable adhesive, such as epoxy resin. Bushing 192 receives leg 44i of end joint fitting 18i and leg 44i is secured therein by a suitable adhesive. Legs 58c and 60c of inner joint fitting 22c are positioned within the end portion of two segments of midrail 24 and secured therein by a suitable adhesive, such as epoxy resin. As is apparent, by employing the combination of joint 168 and coupling assembly 188 one can readily connect handrail member 20 and midrail member 24 to a post member of unitary construction and provide a wide variety of angles for attachment of same.

The handrail system of the present invention is, as stated hereinbefore, constructed of fiber reinforced plastic materials which allow the handrail system to overcome many of the defects and safety hazards of prior art handrail systems. While any suitable fiber reinforced plastic material having desired strength and wear resistant characteristics can be employed to fabricate the various components of the handrail system of the invention, especially desirable results have been obtained where the components of the handrail system have been fabricated using a thermosetting resin in which high tensile strength reinforcing fibers have been incorporated such as set forth in U.S. Pat. No. 3,859,409, entitled "Method of Making a Fiber Reinforced Plastic Article" hereby incorporated by reference.

For example, especially desirable results have been obtained when the various components of the handrail system of the present invention are formed of a thermosetting resin containing from about 50 to about 94 weight percent continuous glass fibers.

The dimensions, including wall thickness and outside diameter of each of the components of the handrail system of the present invention can vary widely. However, durable handrail systems have been constructed where the post members have an outside diameter of about 2 inches and a wall thickness of about ¼ inch; the handrail and midrail members have an outside diameter of about 2 inches and a wall thickness of about ¼ inch; the splice members have an outside diameter of about 1¾ inches and a wall thickness of about ⅛ inch; the bushings will have varying dimensions depending upon their use, for example the bushing can have an outside diameter of about 1⅜ inches and a wall thickness of about ⅛ inch or an outside diameter of about 1⅜ inches and a wall thickness of about ¼ inch; and, each leg of the various joint fitting components have an outside diameter of about 1⅜ inches.

As is apparent, many configurations and modifications of handrail system can be formed using the joint fittings, base mount and post members set forth herein. For example, if one desires to incorporate a toe plate around the edges of the grating floor structure such can readily be accomplished by employing the post members of the present invention in combination with a semicircular plate member having an aperture therethrough which aligns with an aperture in the post member so that same can be secured with a bolt or the like. Preferably, such plate member will be provided with a boss member so as to provide a flat surface against which the toe plate is abutted.

While the present invention has been described with reference to certain specific embodiments, it is to be understood that certain modifications will now be apparent to one skilled in the art upon reading this specification, and it is intended to cover such modifications as fall within the scope of the appended claims.

Having thus described the invention, we claim:

1. An improved fiber reinforced plastic handrail system comprising:
    a. fiber reinforced, hollow, plastic post members;
    b. base mount means for securely affixing each of said post members at its lower end portion to a super structure element of a structure utilizing said handrail system, said base mount means securing each of said post members in a substantially upright, parallel position;
    c. fiber reinforced plastic end joint fitting means formed of two halves said end joint fitting means having a collar means at one end thereof defining a passageway therein for receiving a handrail member and leg means at the other end thereof for connecting said fitting means to said post member;
    d. a fiber reinforced, hollow, handrail member connected to said collar means of said end joint fitting means to interconnect a plurality of said post members, said handrail being securely affixed in each of said collar means by an adhesive;
    e. fiber reinforced plastic inner joint fitting means formed of two halves, said inner joint fitting means having a collar means defining a passageway therethrough for connecting same to said post members at a position intermediate the ends of said posts, said inner joint fitting means further being provided with a pair of leg means extending outwardly in opposite directions from said collar means so as to have a common axis which is substantially perpendicular to the axis of the passageway of said collar means; and,
    f. fiber reinforced hollow midrail members, one end portion of one of said midrail members being secured to one of said leg means of said inner joint fitting means and the other end of said midrail member being secured to a leg means of an inner joint fitting means positioned on an adjacent post member, said midrail member being secured to said leg means by an adhesive.

2. The improved fiber reinforced plastic handrail system of claim 1 which includes a tubular, fiber reinforced plastic handrail splicing member, one end portion of said splicing member being positioned within one end portion of said handrail member and secured therein with adhesive, the remaining portion of said splicing member being positioned within the end portion of a second, abutting handrail member and secured thereto by an adhesive.

3. The improved fiber reinforced plastic handrail system of claim 2 which includes a tubular fiber reinforced plastic midrail splicing member, one end portion of said splicing member being positioned with one end portion of said midrail member and secured therein with adhesive, the remaining portion of said splicing member being positioned within a second abutting midrail member and secured therein with adhesive.

4. The improved fiber reinforced plastic handrail system of claim 3 wherein said base mount means is a fiber reinforced housing member formed of two halves which cooperate to define an elongated cylindrical passageway therethrough for receiving the lower portion of one of said post members, said housing member further being provided with at least two apertures on one half which are aligned with apertures on the other half, and each of said post members is provided with at least two apertures on a common side portion thereof near its lower end portion which are aligned with apertures on the side portion opposite thereof, said apertures in said post member being substantially aligned with the apertures in said housing; and, bolt means positioned within the aligned apertures of said housing means and said post member to secure same to said upper structure.

5. The improved fiber reinforced plastic handrail system of claim 4 wherein said housing member is a cylindrical shaped member provided with a boss member formed as an integral part of said cylindrical shaped member around each aperture in said cylindrical shaped member, said boss members defining a flat surface on each side of said cylindrical member.

6. The improved fiber reinforced plastic handrail system of claim 5 wherein corner connecting means for said handrail and said midrail comprise a first and second connecting member each having a cylindrical shaped leg member extending from an enlarged body member, each of said body members being provided with a bevel side portion at its end removed from said leg member, said bevel side portion having a substantially 45° angle with respect to the longitudinal axis of said leg and said body member, each of said bevel side portions being further provided with a pin receiving aperture, the axis of which is substantially perpendicular to the plane of said bevel side portion; and, pin member adapted to be positioned within said pin receiving aperture to strengthen a joint formed by said connecting members when same are sealed together at the desired angle with an adhesive and said leg members are positioned within the end portions of a handrail member or a midrail member and secured thereto with an adhesive.

7. The improved fiber reinforced plastic handrail system of claim 6 which includes end termination means, said end termination means comprising at least two end joint fitting means each formed of two halves, said end joint fitting means having a collar means at one end thereof defining a passageway therein and leg means at the other end thereof, one of said leg means being positioned within and secured to an end portion of the handrail member and another of said leg means being positioned within and secured to a corresponding end portion of said midrail member, said passageway of each of said collar means being aligned, and a fiber reinforced plastic tubular closure member, one end of said closure member being positioned within the passageway of one of said collar means and secured thereto and the other end of said closure member being positioned within the passageway of another of said collar means and secured thereto.

8. The improved fiber reinforced plastic handrail system of claim 7 which includes tubular, fiber reinforced plastic bushing means positioned upon and secured to the leg means of each of said leg means of said end joint fitting means of said end termination means.

9. The improved fiber reinforced plastic handrail system of claim 8 wherein each element of said system is formed of a thermosetting resin containing from about 50 to about 94 weight percent continuous glass fibers.

10. An improved fiber reinforced plastic handrail means comprising:
  a. sectional fiber reinforced, hollow, plastic post members having a lower segment and an upper segment;
  b. base mount means for securely affixing the lower segment of each of said post members at its lower end portion to a super structure element of a unit employing said handrail means, said base mount means securing each of said lower segments of said post members in an upright, parallel position;
  c. fiber reinforced, plastic inner joint fitting means formed of two halves, said inner joint fitting means having a collar means defining a passageway therethrough and a pair of leg means extending outwardly in opposite directions from said collar means so as to have a common axis which is substantially perpendicular to the axis of the passageway of said collar means, one of said leg means being positioned within, and secured thereto, the upwardly extending end portion of said lower segment of one of said post members and the other of said leg means being positioned within, and secured thereto, the lower extending portion of said upper segment of said post member;
  d. fiber reinforced hollow midrail member positioned within the passageway of said collar means of said inner joint fitting means, said midrail member interconnecting a plurality of said post members;
  e. fiber reinforced plastic end joint fitting means having a collar means at one end thereof defining a passageway therein for receiving a handrail member and leg means at the other end thereof for connecting said end joint fitting means to the upwardly extending end portion of said upper segment of each of said post members;
  f. fiber reinforced hollow handrail member positioned within the passageway of said collar means and secured thereto, said handrail member interconnecting a plurality of said post members; and
  g. tubular fiber reinforced plastic handrail splicing member, one end portion of said splicing member being positioned within one end portion of said handrail member and secured therein with adhesive, the remaining portion of said splicing member being positioned within the end portion of a second handrail member and secured thereto by an adhesive.

11. The improved fiber reinforced plastic handrail system of claim 10 which includes tubular fiber reinforced plastic midrail splicing member, one end portion of said splicing member being positioned within one end portion of said midrail member and secured therein with adhesive, the remaining portion of said splicing member being positioned within a second midrail member and secured therein with adhesive.

12. The improved fiber reinforced plastic handrail system of claim 11 wherein said base mount means is a fiber reinforced housing member formed of two halves which cooperate to define an elongated cylindrical passageway therethrough for receiving the lower portion of the lower segment of each of said post members, said housing means further being provided with at least two apertures on a common side portion which are aligned with apertures on the side portion opposite thereof and said lower segment of each of said post members having at least two apertures on a common side portion thereof near its lower end portion which are aligned with apertures on the side portion opposite thereof, said apertures in said lower segment of said post member being substantially aligned with the apertures in said housing; and, bolt means positioned within the aligned apertures of said housing means and said lower segment of said post member to secure same to said super structure.

13. The improved fiber reinforced plastic handrail system of claim 12 wherein said housing member is a cylindrical member provided with a boss member formed as an integral part of said cylindrical member around each aperture in said cylindrical member, said boss members defining a flat surface on each side of said cylindrical member.

14. The improved fiber reinforced plastic handrail system of claim 13 wherein corner connecting means for said handrail and said midrail comprise a first and second connecting member each having a cylindrical shape leg member extending from an enlarged body member, each of said body member being provided with a bevel side portion at its end removed from said leg member, said bevel side portion having a substantially 45° angle with respect to the longitudinal axis of said leg and said body member, each of said bevel side portions being further provided with a pin receiving aperture the axis of which is substantially perpendicular to the plane of said bevel side portion; and, pin member adapted to be positioned within said pin receiving aperture to strengthen a joint formed by said connecting members when same are sealed together at the desired angle with an adhesive and said leg members are positioned within the end portions of a handrail member and a midrail member and secured thereto with an adhesive.

15. The improved fiber reinforced plastic handrail system of claim 14 which includes end termination means, said end termination means comprising at least two end joint fitting means each formed of two halves, said end joint fitting means having a collar means at one end thereof defining a passageway therein and leg means at the other end thereof, one of said leg means being positioned within and secured to an end portion of the handrail member and another of said leg means being positioned within and secured to a corresponding end portion of said midrail member, said passageway of each of said collar means being aligned, and a fiber reinforced plastic tubular closure member, one end of said closure member being positioned within the passageway of one of said collar means and secured thereto and the other end of said closure member being positioned within the passageway of another of said collar means and secured thereto.

16. The improved fiber reinforced plastic handrail system of claim 15 which includes tubular, fiber reinforced plastic bushing means positioned upon and secured to the leg means of each of leg means of said end joint fitting means of said end termination means.

17. The improved fiber reinforced plastic handrail system of claim 16 wherein each element of said system is formed of a thermosetting resin containing from about 50 to about 94 weight percent continuous glass fibers.

18. An improved fiber reinforced plastic handrail system comprising:

a. fiber reinforced, hollow, plastic post members;

b. base mount means for securely affixing each of said post members at its lower end portion to a superstructure element of a structure utilizing said handrail system, said base mount means securing each of said post members in a substantially upright, parallel position;

c. first fiber reinforced plastic end joint fitting means formed of two halves, said first end joint fitting means having a collar means at one end thereof defining a passageway therein and leg means at the other end thereof for connecting said first fitting means to said post member, said first fitting means being positioned on said post members so that the passageway of said collar means is substantially perpendicular to the plane formed by the alignment of each adjacent post member;

d. second fiber reinforced plastic end joint fitting means formed of two halves, said second end joint fitting means having a collar means at one end thereof defining a passageway therein and leg means at the other end thereof, said leg means of said second fitting means being positioned within the passageway of said first fitting means and secured thereto with an adhesive so that the passageway of each of said second fitting means is aligned with the passageway of each adjacent second fitting means;

e. a fiber reinforced hollow handrail member positioned within the passageway of said collar means of said second fitting means and interconnecting a plurality of said second fitting means and thus a plurality of post means, said handrail member being securely affixed within the passageway of said collar means of said second fitting means by an adhesive;

f. third fiber reinforced plastic end joint fitting means formed of two halves, said third end joint fitting means having a collar means at one end thereof defining a passageway therein and leg means at the other end thereof, said collar means being positioned upon said post member at a position intermediate its ends and secured thereto by an adhesive, said collar means further being positioned so that said leg means extend from said post member substantially perpendicular to the plane formed by the alignment of each adjacent post member;

g. fiber reinforced plastic inner joint fitting means formed of two halves, said inner joint fitting means having a collar means defining a passageway therethrough for connecting same to said leg means of said third end joint fitting means, said inner joint fitting means further being provided with a pair of leg means extending outwardly in opposite directions from said collar means so as to have a common axis which is substantially perpendicular to the axis of the passageway of said collar means, said inner joint fitting means being positioned so that each of said leg means is aligned with the adjacent leg means of said inner joint fitting means secured on each adjacent post member; and, h. fiber reinforced hollow midrail members, one end portion of each of said midrail members being secured to one of said leg means of said inner joint fitting means and the other end of said midrail member being secured to an adjacent leg means of an inner joint fitting means positioned on an adjacent post member, said midrail member being secured to said leg means by an adhesive.

19. The improved fiber reinforced plastic handrail system of claim 18 which includes tubular fiber reinforced plastic bushing means positioned upon each of said leg means of said first, second and third end joint fitting means, said bushing means being secured to each of said leg means by an adhesive.

20. In a handrail system having a plurality of post members interconnected with a handrail member, the improvement comprising fiber reinforced hollow plastic post members and fiber reinforced plastic end joint fitting means formed of two halves, said end joint fitting means having a collar means at one end thereof for receiving the handrail member and leg means at the other end thereof for connecting said fitting means to said post member; fiber reinforced plastic inner joint fitting means formed of two halves, said inner joint fitting means having a collar means defining a passageway therethrough for connecting same to said post members at a position intermediate the ends of said posts, said innerjoint fitting means further being provided with a pair of leg means extending outwardly in opposite directions from said collar means so as to have a common axis which is substantially perpendicular to the axis of the passageway of said collar means; and fiber reinforced hollow midrail members, one end portion of one of said midrail members being secured to one of said leg means of said inner joint fitting means and the other end of said midrail member being secured to a leg means of an inner joint fitting means positioned on an adjacent post member, said midrail member being secured to said leg means by an adhesive.

* * * * *